(12) United States Patent
Clark et al.

(10) Patent No.: US 11,809,434 B1
(45) Date of Patent: *Nov. 7, 2023

(54) SEMANTIC ANALYSIS SYSTEM FOR RANKING SEARCH RESULTS

(71) Applicant: Applied Underwriters, Inc., Omaha, NE (US)

(72) Inventors: David Alan Clark, Elgin, TX (US); Justin N. Smith, Woodside, CA (US); Mark S. Nowotarski, Stamford, CT (US)

( * ) Notice: Subject to any disclaimer, the term of this patent is extended or adjusted under 35 U.S.C. 154(b) by 877 days.

This patent is subject to a terminal disclaimer.

(21) Appl. No.: 16/589,343

(22) Filed: Oct. 1, 2019

Related U.S. Application Data

(63) Continuation of application No. 16/535,159, filed on Aug. 8, 2019, now Pat. No. 10,846,295, and a
(Continued)

(51) Int. Cl.
*G06F 16/2457* (2019.01)
*G06F 16/93* (2019.01)

(52) U.S. Cl.
CPC ........ *G06F 16/24578* (2019.01); *G06F 16/93* (2019.01)

(58) Field of Classification Search
CPC ........................ G06F 16/24578; G06F 16/93
See application file for complete search history.

(56) References Cited

U.S. PATENT DOCUMENTS 5,745,654 A   4/1998  Titan 6,324,555 B1 * 11/2001  Sites ................ G06F 40/10
707/E17.036
(Continued)

FOREIGN PATENT DOCUMENTS

CA        3062119 A1 * 11/2019  ....... G06F 16/24578
WO  WO-2009073151 A1 *  6/2009  ........... G06Q 10/087
(Continued)

OTHER PUBLICATIONS

En.Wikipedia.org, "Nonlinear system", https://en.wikipedia.org/wiki/Nonlinear_system, last viewed Oct. 27, 2020.
(Continued)

*Primary Examiner* — Neveen Abel Jalil
*Assistant Examiner* — Hubert Cheung
(74) *Attorney, Agent, or Firm* — Marin Patents LLC; Gustavo Marin

(57)  ABSTRACT

A computer-implemented semantic analysis system for ranking search results has instructions including the steps: receive a query about a first document authored by a person; read in data identifying the first document; read in a second document about the person authored after the first document; identify indicator terms in the second document related to whether or not there is a significant discrepancy between the second document and the first document; read in weighting factors for the identified indicator terms; determine an aggregate weighting factor that decreases with an increasing number of indicator terms found; and calculate a score of how much of a discrepancy there is between the second document and the first document using the weighting factors. When multiple first documents are returned for multiple persons, present the links in order from high score to low score.

15 Claims, 9 Drawing Sheets

Related U.S. Application Data continuation-in-part of application No. 14/321,905, filed on Jul. 2, 2014, now abandoned.

(60) Provisional application No. 61/950,912, filed on Mar. 11, 2014.

(56) References Cited

U.S. PATENT DOCUMENTS

| | | | |
|---|---|---|---|
| 6,417,801 B1 | 7/2002 | van Diggelen | |
| 6,937,187 B2 | 8/2005 | van Diggelen et al. | |
| 7,693,705 B1 | 4/2010 | Jamieson | |
| 7,813,944 B1* | 10/2010 | Luk | G06Q 10/10 705/2 |
| 7,827,045 B2 | 11/2010 | Madill, Jr. et al. | |
| 8,024,280 B2 | 9/2011 | Jessus et al. | |
| 8,036,978 B1 | 10/2011 | Saavedra-Lim | |
| 8,041,597 B2 | 10/2011 | Li et al. | |
| 8,255,244 B2 | 8/2012 | Raines et al. | |
| 8,280,828 B2 | 10/2012 | Perronnin et al. | |
| 8,346,765 B2 | 1/2013 | Guo et al. | |
| 8,370,279 B1 | 2/2013 | Lin et al. | |
| 8,381,095 B1* | 2/2013 | Fischer | G06F 40/177 715/239 |
| 8,498,931 B2 | 7/2013 | Abrahams et al. | |
| 8,521,679 B2 | 8/2013 | Churchill et al. | |
| 8,533,224 B2 | 9/2013 | Lin et al. | |
| 8,543,520 B2 | 9/2013 | Diao | |
| 8,725,660 B2 | 5/2014 | Forman et al. | |
| 8,744,897 B2 | 6/2014 | Christiansen et al. | |
| 8,799,190 B2 | 8/2014 | Stokes et al. | |
| 8,805,769 B2 | 8/2014 | Ritter et al. | |
| 8,843,422 B2 | 9/2014 | Wang et al. | |
| 8,954,360 B2 | 2/2015 | Heidasch et al. | |
| 9,015,089 B2 | 4/2015 | Servi et al. | |
| 9,058,581 B2 | 6/2015 | Lawrence et al. | |
| 9,069,767 B1* | 6/2015 | Hamaker | G06F 40/194 |
| 9,229,930 B2 | 1/2016 | Sundara et al. | |
| 9,286,301 B2 | 3/2016 | Motoyama | |
| 9,471,643 B2 | 10/2016 | Guo et al. | |
| 10,007,649 B2 | 6/2018 | Avery et al. | |
| 10,121,071 B2 | 11/2018 | Coleman et al. | |
| 10,192,253 B2 | 1/2019 | Huet et al. | |
| 10,445,217 B2 | 10/2019 | Parthasarathy et al. | |
| 10,599,722 B1* | 3/2020 | Ewing | G06F 16/93 |
| 2005/0240858 A1 | 10/2005 | Croft et al. | |
| 2006/0136273 A1 | 6/2006 | Zizzamia et al. | |
| 2006/0224492 A1 | 10/2006 | Pinkava | |
| 2007/0050215 A1 | 3/2007 | Kil et al. | |
| 2007/0282775 A1 | 12/2007 | Tingling | |
| 2008/0077451 A1* | 3/2008 | Anthony | G06Q 40/08 705/4 |
| 2008/0109272 A1 | 5/2008 | Sheopuri et al. | |
| 2008/0227075 A1 | 9/2008 | Poor et al. | |
| 2009/0132445 A1 | 5/2009 | Rice | |
| 2010/0063852 A1 | 3/2010 | Toll | |
| 2010/0131305 A1 | 5/2010 | Collopy et al. | |
| 2010/0145734 A1 | 6/2010 | Becerra et al. | |
| 2010/0299161 A1 | 11/2010 | Burdick et al. | |
| 2011/0015948 A1 | 1/2011 | Adams et al. | |
| 2011/0077977 A1 | 3/2011 | Collins et al. | |
| 2011/0191310 A1 | 8/2011 | Liao et al. | |
| 2012/0323760 A1* | 12/2012 | Lee | G06Q 40/02 705/38 |
| 2013/0124447 A1 | 5/2013 | Badros et al. | |
| 2013/0226623 A1 | 8/2013 | Diana et al. | |
| 2013/0311419 A1 | 11/2013 | Xing et al. | |
| 2013/0339220 A1 | 12/2013 | Kremen et al. | |
| 2013/0340082 A1 | 12/2013 | Shanley | |
| 2014/0058763 A1* | 2/2014 | Zizzamia | G06Q 10/10 705/4 |
| 2014/0059073 A1 | 2/2014 | Zhao et al. | |
| 2014/0114694 A1 | 4/2014 | Krause et al. | |
| 2014/0129261 A1 | 5/2014 | Bothwell et al. | |
| 2014/0172417 A1 | 6/2014 | Monk, II et al. | |
| 2014/0201126 A1 | 7/2014 | Zadeh et al. | |
| 2014/0280204 A1* | 9/2014 | Avery | G06F 16/245 707/748 |
| 2014/0297403 A1 | 10/2014 | Parsons et al. | |
| 2015/0032676 A1 | 1/2015 | Smith et al. | |
| 2015/0039177 A1* | 2/2015 | Chapman | G07C 5/085 701/31.7 |
| 2015/0120631 A1 | 4/2015 | Gotarredona et al. | |
| 2015/0127591 A1 | 5/2015 | Gupta et al. | |
| 2015/0220862 A1 | 8/2015 | De Vries et al. | |
| 2015/0242749 A1 | 8/2015 | Carlton | |
| 2015/0286930 A1 | 10/2015 | Kawanaka et al. | |
| 2015/0310096 A1 | 10/2015 | Bao et al. | |
| 2015/0378972 A1* | 12/2015 | Kapadia | G06F 40/197 715/229 |
| 2015/0379887 A1* | 12/2015 | Becker | G06F 16/93 715/229 |
| 2016/0012544 A1 | 1/2016 | Ramaswamy et al. | |
| 2017/0011125 A1* | 1/2017 | Revelle | G06F 16/9535 |
| 2017/0034271 A1* | 2/2017 | Baptist | G06F 3/0604 |
| 2017/0116179 A1 | 4/2017 | Gagné-Langevin et al. | |
| 2017/0243129 A1* | 8/2017 | Kephart | G06F 16/248 |
| 2018/0011827 A1 | 1/2018 | Avery et al. | |
| 2018/0089155 A1* | 3/2018 | Baron | G06F 16/93 |
| 2018/0096055 A1 | 4/2018 | Houser et al. | |
| 2018/0300351 A1 | 10/2018 | Glover | |
| 2018/0300544 A1 | 10/2018 | Mulder | |
| 2018/0349357 A1 | 12/2018 | Allen et al. | |
| 2019/0034798 A1 | 1/2019 | Yu et al. | |
| 2019/0392057 A1* | 12/2019 | Denoue | G06F 40/106 |
| 2020/0117705 A1* | 4/2020 | Hance | G06F 16/152 |
| 2020/0372405 A1* | 11/2020 | Garcia | G06N 20/00 |
| 2021/0182301 A1* | 6/2021 | Motte | G06F 16/285 |

FOREIGN PATENT DOCUMENTS

| | | |
|---|---|---|
| WO | WO 2010109645 A1 | 9/2010 |
| WO | WO 2019/083889 A1 | 5/2019 |

OTHER PUBLICATIONS

Google Search "read in data", https://www.google.com/?gws_rd=ssl#q="read+in+data", Mar. 11, 2015.

Scatter Plot Smoothing, https://stat.ethz.ch/R-manual/R-devel/library/stats/html/lowess.html, last viewed Apr. 7, 2016.

en.wikipedia.org, Bayesian network, https://en.wikipedia.org/wiki/Bayesian_network, last viewed Mar. 21, 2016.

en.wikipedia.org, Belief revision, https://en.wikipedia.org/wiki/Belief_revision, lasted viewed Mar. 21, 2016.

en.wikipedia.org, Local regression, https://en.wikipedia.org/wiki/Local_regression, last viewed Apr. 4, 2016.

en.wikipedia.org, Monotonic function, https://en.wikipedia.org/wiki/Monotonic_function, last viewed Mar. 21, 2016.

en.wikipedia.org, Semantic network, https://en.wikipedia.org/wiki/Semantic_network, last viewed Mar. 21, 2016.

en.wikipedia.org, Logistic regression, https://en.wikipedia.org/wiki/Logistic_regression, last viewed Mar. 28, 2016.

en.wikipedia.org, Reason maintenance, https://en.wikipedia.org/wiki/Reason_maintenance, last viewed Mar. 21, 2016.

Viaene et al., European Journal of Operational Research 176 (2007) 565-583; O.R. Applications, Strategies for detecting fraudulent claims in the automobile insurance industry; available online at sciencedirect.com, Available online Nov. 22, 2005.

Lucy Carmel, TheLaw. TV, Social Media's Role in Workers' Comp Claims, dated Feb. 27, 2013.

David P. Doane and Lori E. Seward, Measuring Skewness: A Forgoten Statistic?, Journal of Statistics Education, vol. 19, No. 2(2011).

English translation of WO2010109645 A1, Subject Identifying Method, Subject Identifying Program, and Subject Identifying Device.

Tata Consultancy Services Limited and Novarica, Big Data and Analytics in Insurance on Aug. 9, 2012.

Francis Analytics and Actuarial Data Mining, Inc., Predictive Modeling in Workers Compensation 2008 CAS Ratemaking Seminar.

(56) References Cited

OTHER PUBLICATIONS

Hendrix, Leslie; "Elementary Statistics for the Biological and Life Sciences", course notes University of Sout Carolina, Spring 2012.

Roosevelt C. Mosley, Jr., Social Media Analytics: Data Mining Applied to Insurance Twitter Posts, Casualty Actuarial Society E-Forum, Winter 2012—vol. 2.

Sas Institute Inc., Combating Insurance Claims Fraud How to Recognize and Reduce Opportunisitc and Organized Claims Fraud White Paper, 2010.

Tata Consultancy Services, Fraud Analytics Solution for Insurance, 2013.

The Claims Spot, 3 Perspectives On The Use Of Social Media In The Claims Investigation Process dated Oct. 25, 2010, http://theclaimsspot.com/2010/10/25/3-perspectives-on-the-use-of-social-media-in-the-claims- investigation-process/; Oct. 25, 2010.

Wang, Gary C .; Pinnacle Actuarial Resources, Inc., Social Media Analytics/Data Mining Applied to Insurance Twitter Posts; Apr. 16, 2013.

en.wikipedia.org, Spokeo, last viewed Mar. 10, 2014.

Lora Kolodny, Gary Kremen's New Venture, Sociogramics, Wants to Make Banking Human Again dated Feb. 24, 2012; http://blogs.wsj.com/venturecapital/2012/02/24/gary-kremens-new-venture-sociogramics-raises-2m-to-make-banking-human-again/?mg=blogs-wsj&url=http%253A%252F%252Fblogs.wsj.com%252Fventurecapital%252F2012%252F02%252F24%252Fgary-kremens-new-ventu; Feb. 24, 2012.

Wikipedia.com, Global Positioning System, https://en.wikipedia.org/wiki/Global_Positioning_System, last viewed Sep. 26, 2016.

Stijn Viaene, ScienceDirect European Journal of Operational Research 176 (2007) 565-583, Strategies for detecting fraudulent claims in the automobile insurance industry, www.elsevier.com/locate/ejor, viewed Oct. 20, 2015.

Curt De Vries, et al., Provisional U.S. Appl. No. 61/935,922, "System and Method for Automated Detection of Insurance Fraud" dated Feb. 5, 2014.

International Risk Management Institute, Inc., Event Risk Insurance Glossary, http://www.irmi.com/online/insurance-glossary/terms/e/event-risk.aspx., Jul. 24, 2015.

\* cited by examiner

700 Results of method for automatically adjusting weighting factors

| | | Indicator Weighting Factors | | | | | | | | | |
|---|---|---|---|---|---|---|---|---|---|---|---|
| | 1.4 | 65.0 | 84.3 | 60.8 | 76.6 | 1.2 | | | | | |
| Claimant ID | "baseball" | "gym" | "hiking" | "running" | "tennis" | "weekend" | Number of indicator terms $N$ | $V'$ | $p'$ | Adjudication of Significant Discrepancy | Residual² |
| 1 | 0 | 0 | 0 | 0 | 0 | 0 | 0 | 0.0 | 0.00 | 0 | 0.00 |
| 2 | 0 | 0 | 0 | 0 | 0 | 0 | 0 | 0.0 | 0.00 | 0 | 0.00 |
| 3 | 0 | 0 | 0 | 1 | 0 | 0 | 1 | 60.8 | 1.00 | 1 | 0.00 |
| 4 | 0 | 0 | 0 | 0 | 0 | 0 | 0 | 0.0 | 0.00 | 0 | 0.00 |
| 5 | 0 | 0 | 0 | 0 | 0 | 0 | 0 | 0.0 | 0.00 | 0 | 0.00 |
| 6 | 0 | 0 | 0 | 0 | 0 | 0 | 0 | 0.0 | 0.00 | 0 | 0.00 |
| 7 | 0 | 0 | 0 | 0 | 0 | 0 | 0 | 0.0 | 0.00 | 0 | 0.00 |
| 8 | 0 | 0 | 0 | 0 | 0 | 0 | 0 | 0.0 | 0.00 | 0 | 0.00 |
| 9 | 0 | 0 | 0 | 0 | 0 | 1 | 1 | 1.2 | 0.60 | 0 | 0.36 |
| 10 | 0 | 0 | 0 | 0 | 0 | 0 | 0 | 0.0 | 0.00 | 0 | 0.00 |
| 11 | 0 | 0 | 0 | 0 | 0 | 1 | 1 | 1.2 | 0.60 | 1 | 0.16 |
| 12 | 0 | 0 | 0 | 0 | 0 | 0 | 0 | 0.0 | 0.00 | 0 | 0.00 |
| 13 | 0 | 0 | 0 | 0 | 0 | 0 | 0 | 0.0 | 0.00 | 0 | 0.00 |
| 14 | 0 | 1 | 0 | 0 | 0 | 0 | 0 | 0.0 | 1.00 | 0 | 0.00 |
| 15 | 1 | 0 | 0 | 1 | 0 | 0 | 2 | 62.1 | 1.00 | 1 | 0.00 |
| 16 | 0 | 0 | 0 | 0 | 0 | 0 | 0 | 0.0 | 0.00 | 0 | 0.00 |

| SSQ | D | A |
|---|---|---|
| 1.866668 | −0.00138 | 0.069896 |

Fig. 7

SEMANTIC ANALYSIS SYSTEM FOR RANKING SEARCH RESULTS

Copyright and Trademark Notice:

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

Background of the Invention:

There is need for a computer-based semantic analysis system for ranking search results wherein the search query seeks to find first documents authored by persons with content about themselves that have a significant discrepancy with second documents that have content about said persons. The second documents may be authored by the persons themselves or by other persons that are different than said persons.

SUMMARY OF THE INVENTION:

The summary of the invention is provided as a guide to understanding the invention. It does not necessarily describe the most generic embodiment of the invention or the broadest range of alternative embodiments.

FIG. 1 is a schematic of a computer-based semantic analysis system 100 for ranking search results. FIG. 2 is a flow chart of a method 200 for semantic ranking of search results. FIG. 3 is a flow chart of a method 300 for determining a semantic ranking score. Referring to FIGS. 1, 2, and 3, the semantic analysis system comprises:

a) an input device 102 for reading in data;
b) a microprocessor 104 for processing said data;
c) an output device 106 for outputting said processed data; and
d) a permanent memory 108 comprising computer readable instructions to physically cause said microprocessor to carry out a method 200 (FIG. 2) comprising the steps:
  i) receive 112, 202 via said input device, a search query (e.g. from a user 110);
  ii) responsive to said search query, read in 113, 204 data (e.g. a link 176, such as a hyperlink) identifying a first document 114 authored by a person 111 in a set of persons wherein:
    1) said first document comprises textual content 116 about said person;
    2) said first document was authored at a first time; and
    3) said first document is computer accessible by a link 176;
  iii) read in 122, 206 a second document 124 wherein said second document was authored after said first time and wherein said second document comprises textual content 126 about said person;
  iv) read in 132, 208 a set of indicator terms 134 that are associated with a discrepancy between said textual content of said second document and said textual content of said first document;
  v) determine 136, 210 which 138, 142 of said indicator terms are present in said second document;
  vi) determine 140, 212 a score 152 indicating how much of a discrepancy there is between said textual content of said second document and said textual content of said first document according to the steps 300:
    1) read in 144, 302 an indicator weighting factor 146, 148, 154 for each of said indicator terms present 156, 158 in said second document (note: $\delta_i$ has a numerical value of 1 when an indictor term is present and a numerical value of 0 when an indicator term is not present);
    2) determine 304 a first sum 162 of all of said indicator weighting factors for all of said indicator terms present in said second document;
    3) determine 306 a second sum equal to said first sum plus a constant D 164;
    4) determine 308 a count N 166 of the number of said indicator terms present in said second document; and
    5) determine 310 said score by multiplying said second sum by an aggregate weighting factor $C_N$ 168 that has a value of 1 when N is 1 and decreases with increasing N over a range of N;
  vii) compare 170, 214 (FIG. 2) said score 152 to a threshold 172; and
  viii) provide 174 by said output device, said link 176 to said first document when said score is greater than or equal 178 to said threshold.

BRIEF DESCRIPTION OF DRAWINGS:

FIG. 7 is a table presented on a screen of results of the method for automatically adjusting weighting factors.

DETAILED DESCRIPTION:

The detailed description describes non-limiting exemplary embodiments. Any individual features may be combined with other features as required by different applications for at least the benefits described herein.

As used herein, the term "about" means plus or minus 10% of a given value unless specifically indicated otherwise.

As used herein, a "computer-based system" comprises an input device for receiving data, an output device for outputting data in tangible form (e.g. printing or displaying on a computer screen), a permanent memory for storing data as well as computer code, and a microprocessor or other type of digital processor for executing computer code wherein said computer code resident in said permanent memory will physically cause said microprocessor to read in data via said input device, process said data by said microprocessor and output said processed data via said output device.

An input device may be any device adapted to receive input and, if needed, convert said input to computer usable form (e.g. digital encoding). Input devices include keyboards, cameras, microphones and digital inputs for receiving data from other computer-based systems.

An output device may be any device adapted to output data. Output devices include computer screens, speakers, printers and digital output devices for sending data to other computer-based systems.

As used herein, a formula or equation is only an expression of an algorithm or method. For example, the formula "Y=A+B" is an expression of the prose algorithm "Set the value of Y equal to the value of A plus the value of B". A person of ordinary skill in the art of computer science will understand that said prose algorithms can be expressed as a series of one or more steps of a computer coded algorithm. As used herein, therefore, an equation or formula is not an expression of an abstract idea, a law of nature or any other fundamental truth.

Ranking Multiple Search Results

Figure 2:
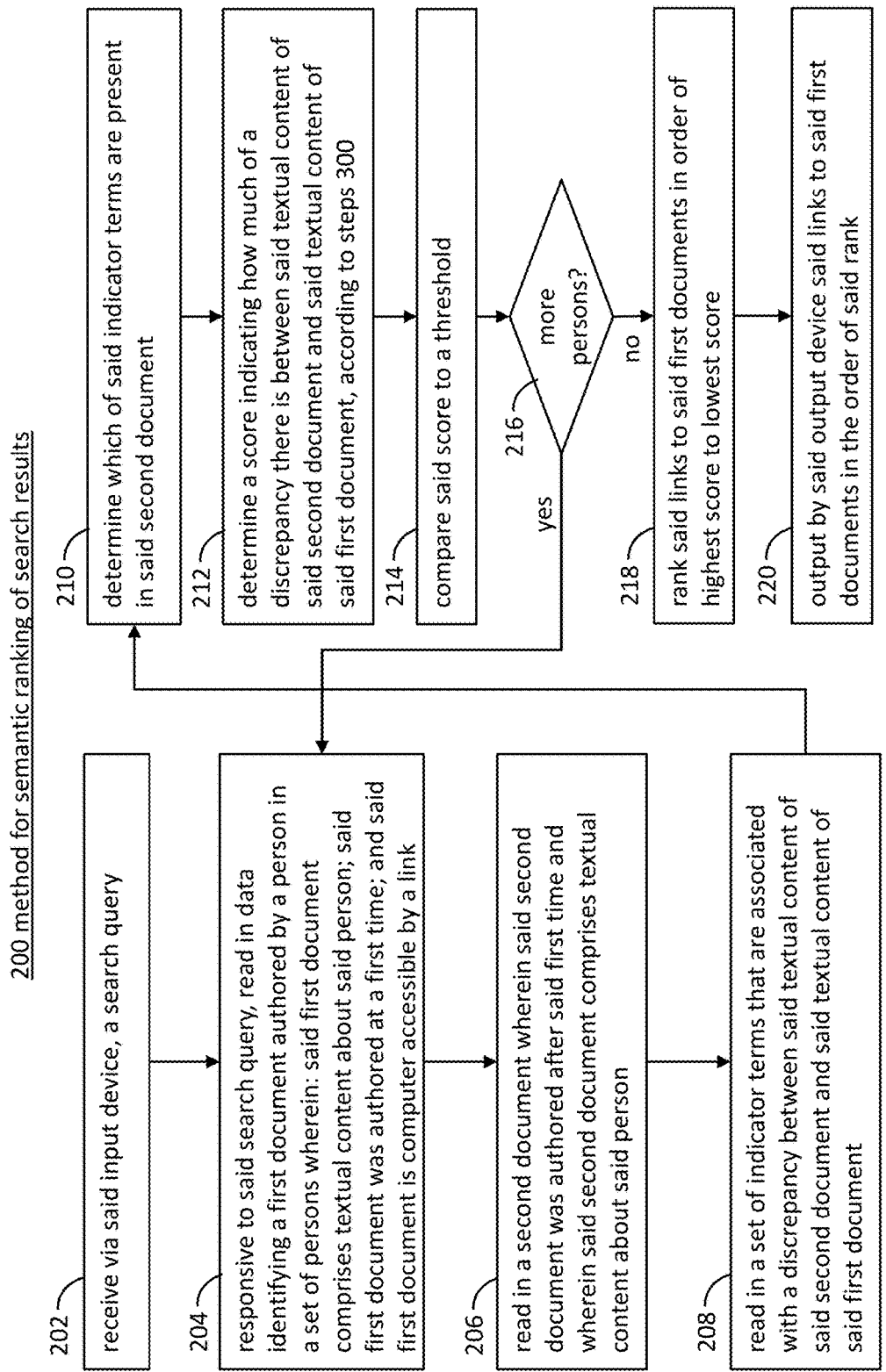
FIG. 2 is a flow chart of a method for semantic ranking of search results.
Figure 3:
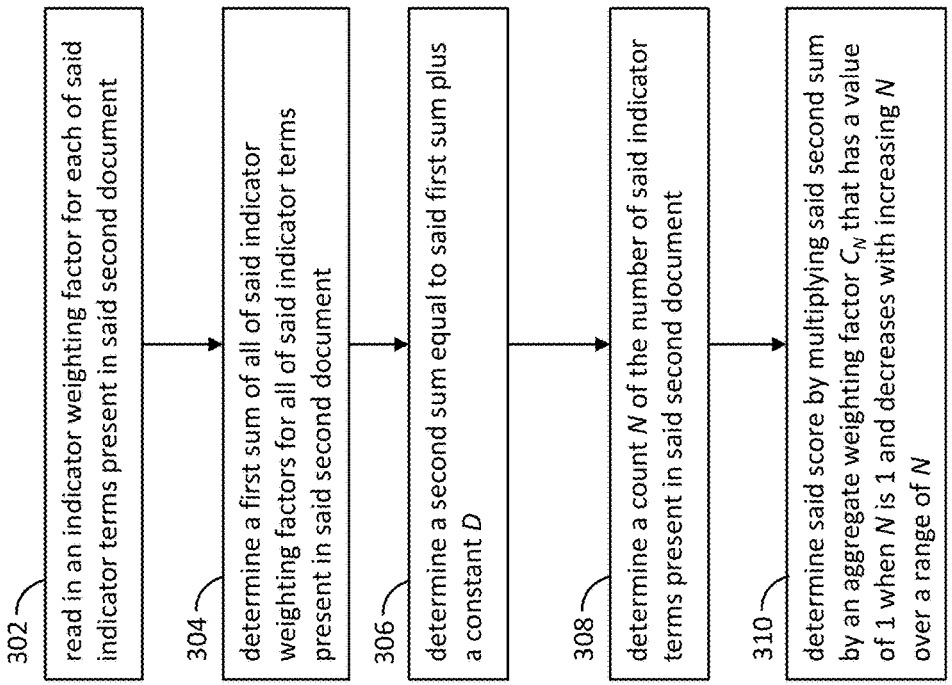
FIG. 3 is a flow chart of a method for determining a semantic ranking score.

Multiple search results can be ranked according to the method illustrated in FIG. 2. The method for ranking search results comprises the steps:
- a) execute 216 said steps ii to vii (i.e. items 204 to 214) for each person in said set of persons to determine a score for each first document authored by said each of said persons, wherein each of said first documents is accessible by a link;
- b) rank 218 said links to said first documents in order of highest score to lowest score; and
- c) output 220 by said output device, said links to said first documents in said order of said rank.

As used herein, "ranking from high score to low score" also encompasses ranking from low score to high score. For example, if one determines a score equal to the inverse of the score described herein, then ranking would be from low inverse score to high inverse score.

Determining an Aggregate Weighting Factor

Figure 4:
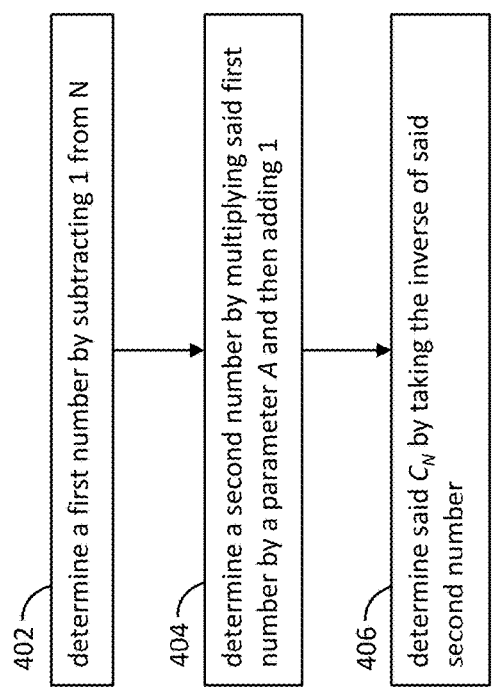
FIG. 4 is a flow chart of a method for determining an aggregate weighting factor.

FIG. 4 is a flow chart of a method 400 for determining an aggregate weighting factor, $C_N$. The method comprises the steps:
- a) determine 402 a first number by subtracting 1 from N;
- b) determine 404 a second number by multiplying said first number by a parameter A and then adding 1; and
- c) determine 406 said $C_N$ by taking the inverse of said second number.

The parameter A may have a value of about 0.07. The parameter A may have values such that $C_N$ decreases from 1 to 0.8 or less over a range of N of 1 to 2.

The constant D as described above may have a value less than zero. D may have a value of about −.00138.

Automatically Adjusting a Threshold

Figure 5:
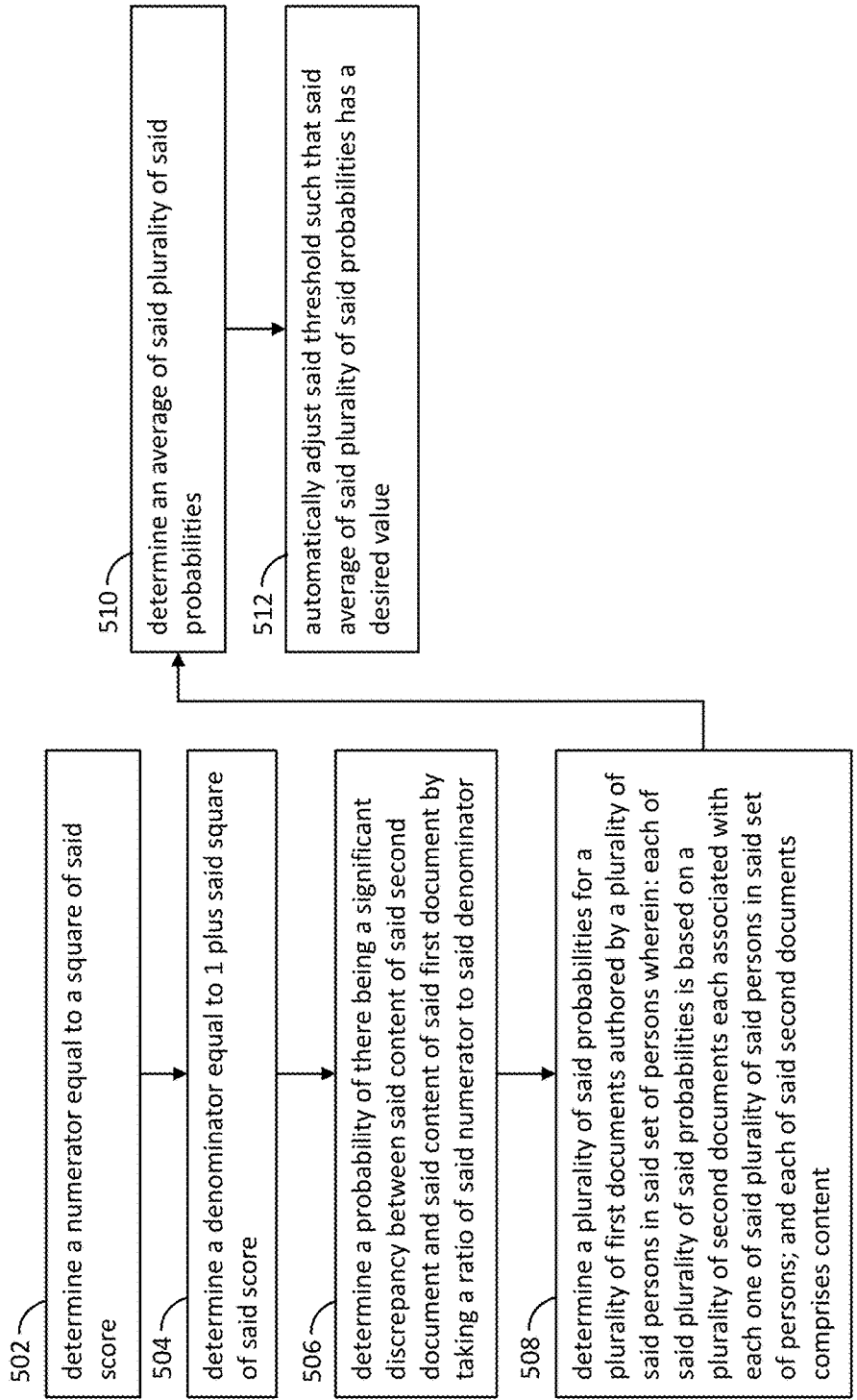
FIG. 5 is a flow chart of a method for automatically adjusting a threshold.

FIG. 5 is a flow chart of a method 500 for automatically adjusting a threshold, $V'_o$. The method comprises the steps:
- a) determine 502 a numerator equal to a square of said score;
- b) determine 504 a denominator equal to 1 plus said square of said score;
- c) determine 506, 180 (FIG. 1) a probability of there being a significant discrepancy between said content of said second document and said content of said first document by taking a ratio of said numerator to said denominator;
- d) determine 508 a plurality of said probabilities for a plurality of first documents authored by a plurality of said persons in said set of persons wherein:
  - i) each of said plurality of said probabilities is based on a plurality of second documents each associated with each one of said plurality of said persons in said set of persons; and
  - ii) each of said second documents comprises content;
- e) determine 510 an average of said plurality of said probabilities; and
- f) automatically adjust 512 said threshold such that said average of said plurality of said probabilities has a desired value.

A suitable value of said desired value is in the range of 0.8 or greater.

Automatically Adjusting Weighting Factors

Figure 6:
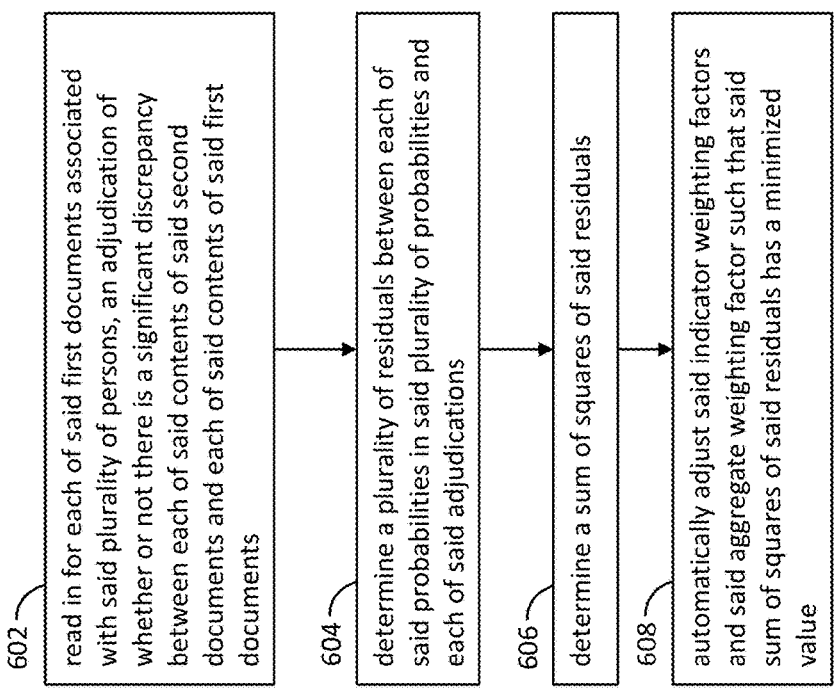
FIG. 6 is a flow chart of a method for automatically adjusting weighting factors.

FIG. 6 is a flow chart of a method 600 for automatically adjusting the indicator weighting factors and the aggregate weighting factor. The method comprises the steps:
- a) read in 602 for each of said first documents associated with said plurality of persons, an adjudication of whether or not there is a significant discrepancy between each of said contents of said second documents and each of said contents of said first documents;
- b) determine 604 a plurality of residuals between each of said probabilities in said plurality of probabilities and each of said adjudications;
- c) determine 606 a sum of squares of said residuals;
- d) automatically adjust 608 said indicator weighting factors and said aggregate weighting factor such that said sum of squares of said residuals has a minimized value.

As used herein, a "minimized value" is a value that is reduced from an initial level to a subsequent lower level. It does not necessarily mean that a given value is at its lowest possible level.

As used herein, an "aggregate weighting factor" may include multiple values of the aggregate weighting factor for different values of N over a range of N. Hence multiple values of the aggregate weighting factor for a range of values of N may be automatically adjusted so that the sum of squares of the residuals has a minimized value.

As used herein, an "adjudication" is an independent assessment of whether or not there is a significant discrepancy between the content of a second document and the content of a first document. The independent assessment may be performed automatically at least in part by a computer-based system, performed at least in part by a person, or a combination of both. For the purposes of computation, an adjudication may have a numerical value of 1 when there is a significant discrepancy and a numerical value of 0 when there is not a significant discrepancy. Alternatively, an adjudication may have a fractional value between 0 and 1 when the adjudication is an independent estimate of the probability of there being a significant discrepancy.

As used herein, a probability may be expressed in any units, such as fractional (i.e. 0 to 1) or percentage (i.e. 0% to 100%). Thus, any particular units (e.g. fractional) recited herein encompass all units (e.g. percentage).

Examples

It has been discovered that the methods described herein are effective at determining if there is a likelihood of a significant discrepancy between the content of a first document authored by a person at a first time and a second document with content about the person authored at a later time. The first document might be an application form. The application form may be one or more of a job application, an application for citizenship, an insurance claim, a posting on a dating web site, an application for security clearance, a loan application, a patent application or any document authored by a person that is to be submitted to a third party for an approval.

A person submitting an application form to a third party for approval may be motivated to withhold information or falsify information in order to secure said approval. The third party, therefore, has need to find out if the information in the application form is consistent with other information about the person that might be in a second document either authored by the same person or another person. Second documents may include social media postings by the same person, a blog posting by another person or any other document in any other medium. If the application form is for an insurance claim related to a loss event suffered by the person (e.g. an on-the-job injury), then it may be desirable for the second document to be authored after the first document or at least after the loss event since the insurance claim attests to a change in health of the person.

Figure 1:
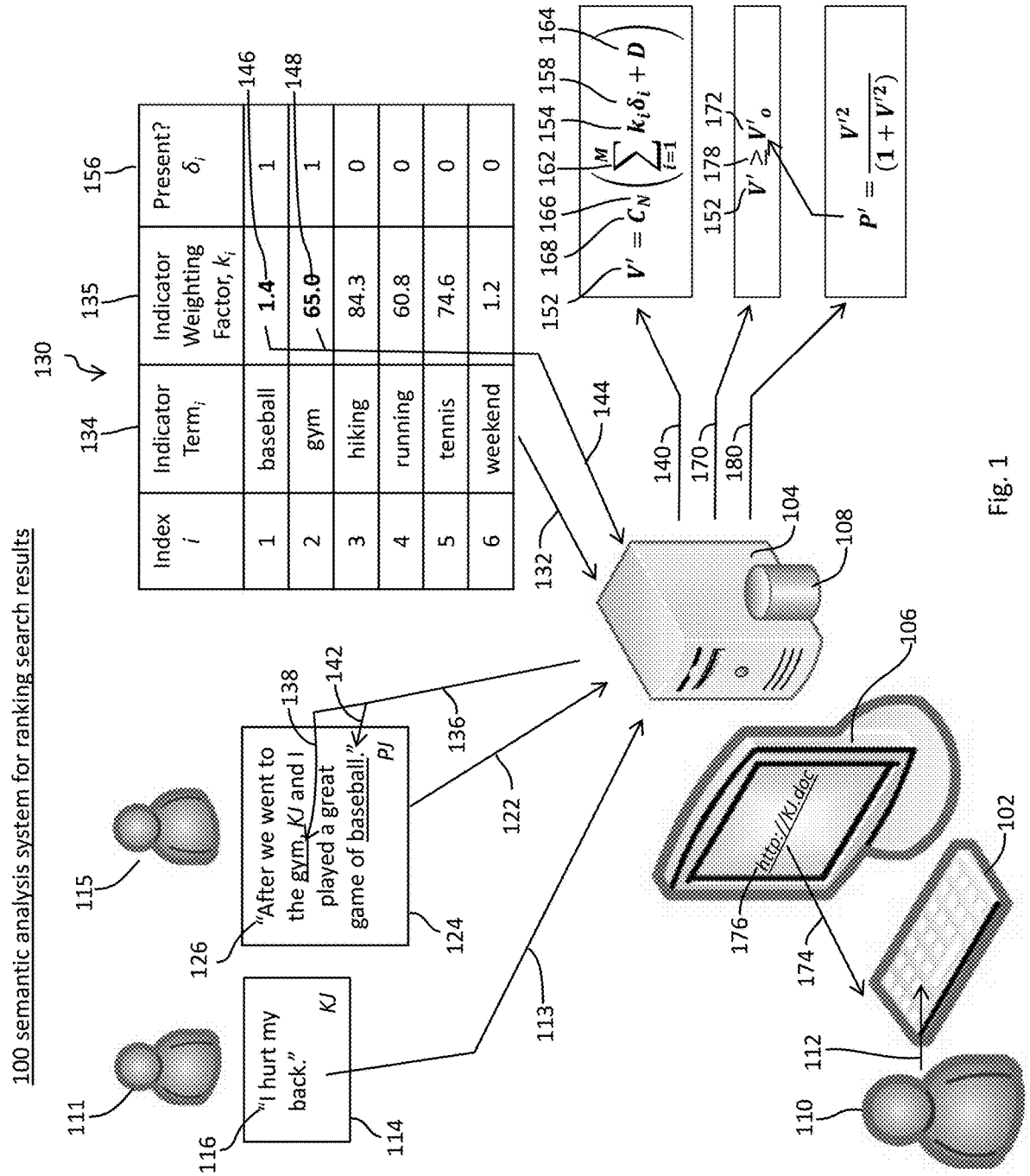
FIG. 1 is a schematic of a semantic analysis system for ranking search results.

A third party may have a list of indicator terms that, if found in a second document, indicate that there is a discrepancy between the content of the second document and the content of the first document. The loss terms may be specific to the type of application form and the contents of the application form. Referring to FIG. 1, for example, if a person 111 (e.g. initials K J) submits an application form 114 for a workers' compensation insurance claim and the content 116 of the application form states that the person suffered a back injury (e.g. "I hurt my back"), but another person 115 (e.g. initials P J) states in a blog posting or other social media posting "After we went to the gym, K J (i.e. the person) and I played a great game of baseball", and if the second document was authored after the first document, then that would indicate that perhaps the person did not injure their back after all.

Second documents authored before the purported change in health may be examined to determine if the adverse health condition of the person existed before the alleged injury. The indicator terms, therefore, may be different depending upon whether the second document was authored before or after the first document. The indicator terms may also be different depending upon the nature of the alleged injury.

The third party may have a large number of similar application forms to automatically process in a short period of time. The third party, therefore, may develop a list 130 (FIG. 1) of indicator terms 134 and associated indicator weighting factors 135 such that if the indicator terms are found 138, 142 in the second documents, the semantic analysis system can then determine scores V' 152 for the first documents based on the second documents. The first documents with scores above a threshold V'$_o$ may then be ranked by said scores and presented to a user 110 in the order of said ranking. Thus, the user can focus on the high scores first and investigate them further to determine if the associated application forms should be accepted.

Example 1: Automatically Adjusting Weighting Factors

Any method, including human judgment, may be used to develop an initial set of indicators and weighting factors. The weighting factors may be adjusted over time, however, as additional data becomes available. This is an example of machine learning.

FIG. 7 is a partial table 700 of results of the method 600 (FIG. 6) for automatically adjusting weighting factors after said method 600 had been applied to additional data that had become available. The table was presented on a screen 720 as part of a graphical user interface.

To execute the method 600, a set of one hundred workers' compensation insurance claims (i.e. first documents) from one hundred claimants 702 (i.e. persons in a set of persons) were adjudicated 712 to determine which claims were legitimate (i.e. accepted applications as indicated by a "0") and which claims were not (i.e. applications not accepted as indicated by a "1"). The results were read in to the computer-based semantic analysis system 100. The system then accessed the social media sites of the persons submitting the insurance claims and identified second documents authored after the dates of the claims. The second documents had content about the persons. The system also read in a list 704 of six indicator terms from a permanent memory. The list of indicator terms comprised the terms "baseball", "gym", "hiking", "running", "tennis", and "weekend". Other indicator terms could have been included as well. The system then read in initial values of associated indicator weighting factors 722, the parameter A 718 and the constant D 716. The system then determined if the indicator terms were ("1") or were not ("0") found 705 in the second documents. The system then determined to total number N of indicator terms found in each 706 of the second documents. The system then calculated risk factors 708 for each person and associated probabilities 710 per the methods described above. The system then calculated the squares (e.g. 728, 726, 724) of the residuals between the adjudications and the probabilities. The system then determined the sum 714 of the squares of the residuals. The system then automatically adjusted the indicator weighting factors, the parameter A and the constant D used to calculate the aggregate weighting factors versus N so that the sum of squares of the residuals had a minimized value (i.e. a magnitude lower than its initial value). The final results of the minimization are shown in table 700.

Expressions of Methods as Formulas

In order to facilitate code writing, the methods described herein may be compactly expressed as formulas. Since formulas are only used to express methods in a compact form, they are not expressions of fundamental truths or laws of nature. For example, the method 300 of determining a semantic ranking may be expressed as:

$$V' = C_N \left( \sum_{i=1}^{M} k_i \delta_i + D \right)$$

where
  V' is the score;
  $C_N$ is the aggregate weighting factor;
  N is the number of indicator terms found in a second document;

M is the total number of indicator terms in a set of indicator terms;

i is an index number for each indicator term;

$k_i$ is an indicator weighting factor for indicator i;

$\delta_i$ has a value of 1 when an indicator term is present in a second document and a value of 0 when an indicator term is not found in a second document; and D is a constant.

Aggregate Weighting Factor Versus N

Figure 8:
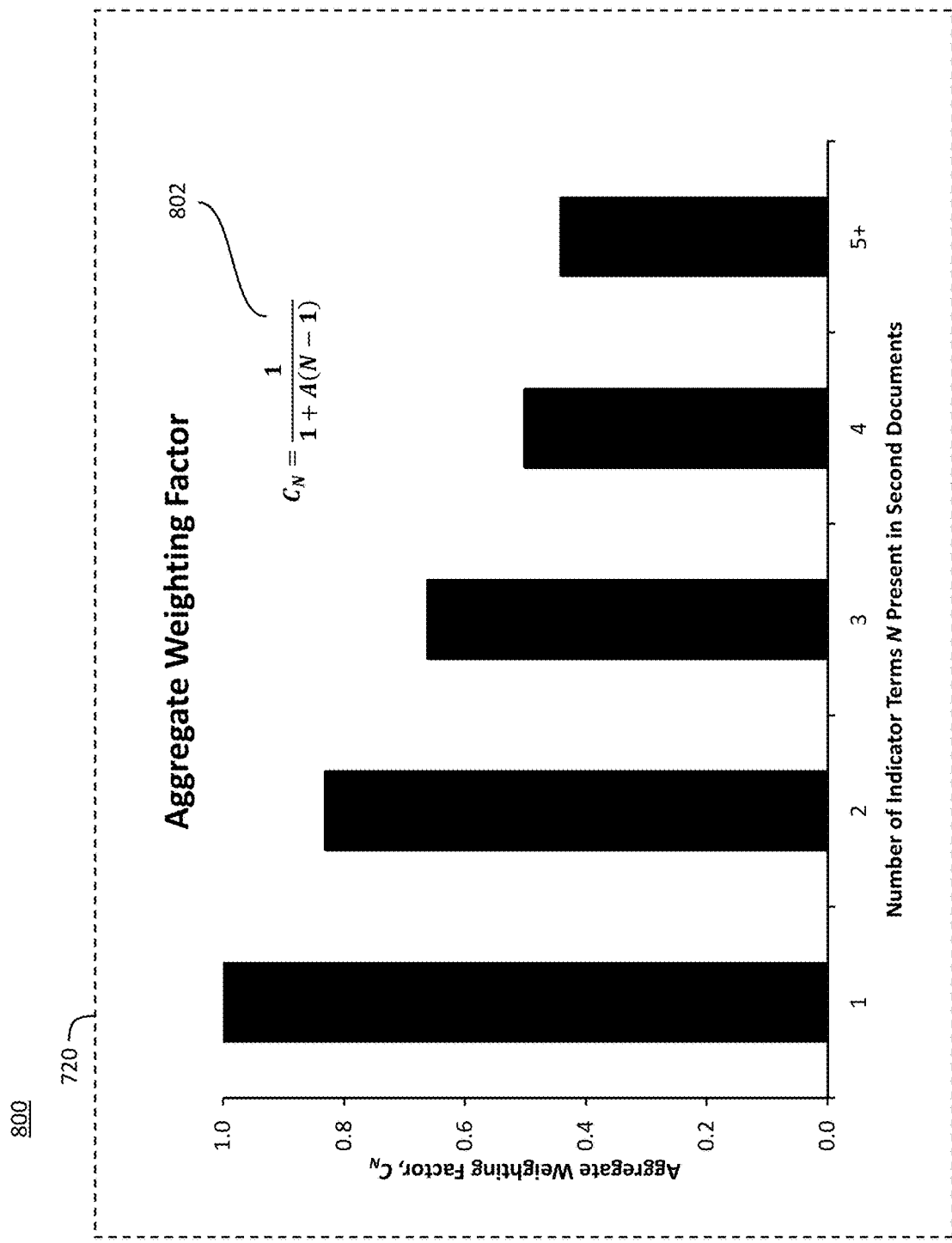
FIG. 8 is a graph presented on a screen of the values of aggregate weighting factors $C_N$ versus N produced by the method for automatically adjusting weighting factors.

FIG. 8 is a graph 800 of suitable aggregate weighting factors $C_N$ versus the number N of indicator terms found in second documents. The graph is presented on screen 720 as a graphical user interface. The method 400 of calculating $C_N$ from the parameters A and N can be expressed as 802:

$$C_N = \frac{1}{1 + A(N-1)}$$

where the variables are defined above. Any method that decreases $C_N$ over a range of N, however, can be used. A $C_N$ that decreases from 1 at N=1 to .8 or less at N=2 is suitable. Physically, a decreasing $C_N$ with increasing N means that each additional indicator term found in a second document adds incrementally less to the overall score that what one would expect if the indicator weights were merely summed without the aggregate weighting factor.

Probability of Significant Discrepancy

The method steps 502 to 506 of determining a probability P' of there being a significant discrepancy between the content of a second document and the content of a first document can be expressed as:

$$P' = \frac{V^2}{(1 + V'^2)}$$

where the variables are defined above.

The method steps 502 to 506 are an example of an asymptotic transformation. As used herein, an asymptotic transformation is a transformation of an increasing variable to a variable with a finite upper limit, such as 1. Any asymptotic transformation may be used to convert a score into a probability. This includes an exponential transformation.

Example 2: False Positives and False Negatives

The methods described in Example 1 were repeated with a larger sample for 5,288 workers' compensation insurance claims. All claims were adjudicated to determine if they were legitimate (i.e. no significant discrepancy) or fraudulent (i.e. significant discrepancy). 2,330 of the claims were confirmed to have a significant discrepancy. The social media data (i.e. second documents) for the claimants (i.e. persons in a set of persons) was read in and compared to a list of 59 indicator terms. 2,126 of the claimants had one or more indicator terms in their social media data and had scores above a threshold. The social media data was all authored subsequent to the time of injury listed on the insurance claims. 1,770 of the claims that had scores above the threshold were adjudicated as having a significant discrepancy. 356 of the claims with scores above the threshold were adjudicated not having a significant discrepancy. Thus, the overall false positive rate of claims with scores above the threshold was about 356/2126=16.7%.

3,162 of the claims did not have an indicator term in the associated social media data (i.e. second documents) and hence had scores below the threshold. 630 of these claims were adjudicated as having a significant discrepancy. 2,532 of these claims were adjudicated as not having a significant discrepancy. Thus, the false negative rate of claims without an indicator term was about 630/3162=19.9%.

A desired probability may be selected depending upon the relative costs of false positives and false negatives so that the overall operating cost of the system is minimized.

Effect of Aggregate Weighting Factor

Figure 9:
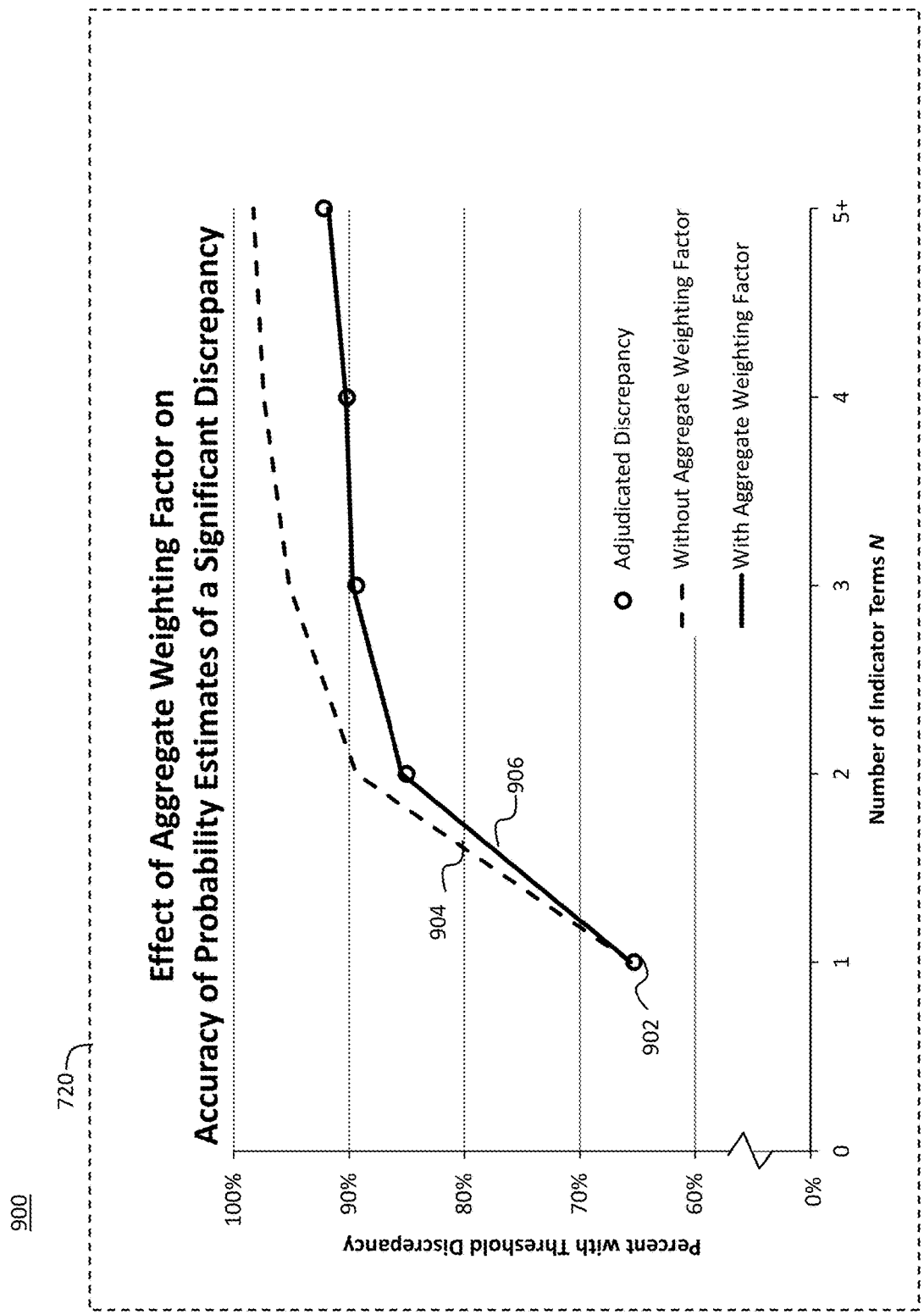
FIG. 9 is a graph presented on a screen illustrating the accuracy of the method for semantic ranking of search results with and without an aggregate weighting factor $C_N$ that decreases with increasing N over a range of N.

FIG. 9 shows a graph 900 of the effect of the aggregate weighting factor on the accuracy of the probability estimates of a significant discrepancy. The graph is displayed on screen 720 as part of a graphical user interface. The data points 902 show the percent of second documents with an adjudicated significant discrepancy versus the number N of indicator terms found in the associated second documents. About 65% of the claims with 1 indicator term were adjudicated to have a significant discrepancy. About 86% of the claims with 2 indicator terms were adjudicated to have a significant discrepancy.

The solid line 906 shows the calculated probability of a significant discrepancy using the methods described herein with an aggregate weighting factor that decreased with increasing N. The agreement between the calculated solid line and the adjudicated data points is good.

The dashed line 904 shows the calculated probability without an aggregate weighting factor. Without an aggregate weighting factor that decreased with increasing N, the calculated probability of a significant discrepancy is increasingly over estimated relative to the adjudicated data as N increases.

Conclusion

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. For example, as used herein, an "indicator term" may be a word, phrase, number, concept, static image, moving image, sound or any other content. A "document" can be any record in any medium, such as a video, social media posting, handwritten document on paper, or digital image. Therefore, it is intended that the disclosure not be limited to the particular embodiments disclosed as the best mode contemplated for carrying out this invention.

We claim:

1. A semantic analysis system for ranking search results comprising:
   an input device for reading in data;
   a microprocessor for processing the data;
   an output device for outputting the processed data; and
   a permanent memory comprising computer readable instructions to physically cause the microprocessor to carry out the steps:

receive via the input device, a search query;
responsive to the search query, read in data identifying a first document authored by a person in a set of persons wherein:
the first document comprises content about the person;
the first document was authored at a first time; and
the first document is computer accessible by a link;
read in a second document wherein the second document was authored after the first time and wherein the second document comprises content about the person;
read in a set of indicator terms that are associated with a discrepancy between the content of the second document and the content of the first document;
determine which of the indicator terms are present in the second document;
determine a score indicating how much of the discrepancy there is between the content of the second document and the content of the first document according to the steps:
read in an indicator weighting factor for each of the indicator terms present in the second document;
determine a first sum of all of the indicator weighting factors for all of the indicator terms present in the second document;
determine a second sum equal to the first sum plus a constant D;
determine a count N of the number of the indicator terms present in the second document; and
determine the score by multiplying the second sum by an aggregate weighting factor $C_N$ that decreases with increasing N over a range of N;
compare the score to a threshold; and
provide by the output device the link to the first document when the score is greater than or equal to the threshold.

2. The semantic analysis system of claim 1 wherein steps further comprise:
to determine a score for each first document authored by the each of the persons for each person in the set of persons repeat the steps:
responsive to the search query, read in data identifying a first document authored by a person in a set of persons wherein:
the first document comprises content about the person;
the first document was authored at a first time; and
the first document is computer accessible by a link;
read in a second document wherein the second document was authored after the first time and wherein the second document comprises content about the person;
read in a set of indicator terms that are associated with a discrepancy between the content of the second document and the content of the first document;
determine which of the indicator terms are present in the second document;
determine a score indicating how much of the discrepancy there is between the content of the second document and the content of the first document according to the steps:
read in an indicator weighting factor for each of the indicator terms present in the second document;
determine a first sum of all of the indicator weighting factors for all of the indicator terms present in the second document;
determine a second sum equal to the first sum plus a constant D;
determine a count N of the number of the indicator terms present in the second document; and
determine the score by multiplying the second sum by an aggregate weighting factor $C_N$ that decreases with increasing N over a range of N; compare the score to a threshold; and
provide by the output device the link to the first document when the score is greater than or equal to the threshold, wherein each of the first documents is accessible by a link;
rank the links to the first documents in order of highest score to lowest score; and
output by the output device, the links to the first documents in the order of the rank.

3. The semantic analysis system of claim 1 wherein CN decreases from 1.0 to 0.8 or less over a range of N of 1 to 2.

4. The semantic analysis system of claim 1 wherein the steps further comprise:
determine a first number by subtracting 1 from N;
determine a second number by multiplying the first number by a parameter A and then adding 1; and
determine the $C_N$ by taking the inverse of the second number.

5. The semantic analysis system of claim 4 wherein the parameter A is about 0.07.

6. The semantic analysis system of claim 1 wherein D is set to a value of zero or less.

7. The semantic analysis system of claim 1 wherein the first document is an application form submitted to a third party for approval.

8. The semantic analysis system of claim 7 wherein the first document is one or more of:
a job application;
an application for citizenship;
an insurance claim;
a posting on a dating web site;
an application for security clearance;
a loan application; or
a patent application.

9. The semantic analysis system of claim 1 wherein the second document is one or more of:
a social media posting authored by the person; or
a blog post authored by another person who is not the person.

10. The semantic analysis system of claim 1 wherein the steps further comprise:
determine a numerator equal to a square of the score;
determine a denominator equal to 1 plus the square of the score;
determine a probability of there being a significant discrepancy between the content of the second document and the content of the first document by taking a ratio of the numerator to the denominator;
determine a plurality of the probabilities for a plurality of first documents authored by a plurality of the persons in the set of persons wherein:
each of the plurality of the probabilities is based on a plurality of second documents each associated with each one of the plurality of the persons in the set of persons; and
each of the plurality of second documents comprise content;
determine an average of the plurality of the probabilities; and
automatically adjust the threshold such that the average of the plurality of the probabilities has a desired value.

11. The semantic analysis system of claim 10 wherein the desired value of the average of the plurality of the probabilities is 0.8 or greater.

12. The semantic analysis system of claim 10 wherein the steps further comprise:
   read in for each of the first documents associated with the plurality of persons, an adjudication of whether or not there is a significant discrepancy between each of the contents of the second documents and each of the contents of the first documents;
   determine a plurality of residuals between each of the probabilities in the plurality of probabilities and each of the adjudications;
   determine a sum of squares of the residuals;
   automatically adjust the indicator weighting factors and the aggregate weighting factor such that the sum of squares of the residuals has a minimized value.

13. The semantic analysis system of claim 12 wherein the adjudications have a numerical value of 1 when there is a significant discrepancy and a numerical value of 0 when there is not a significant discrepancy.

14. The semantic analysis system of claim 1 wherein the indicator terms comprise one or more of:
   a word;
   a phrase;
   a number;
   a concept;
   a static image;
   a moving image; or
   a sound.

15. The semantic analysis system of claim 1 wherein the documents comprise one or more of:
   a video;
   a social media posting;
   a handwritten document on paper; or
   a digital image.

* * * * *